United States Patent
Idriss et al.

(10) Patent No.: US 9,421,537 B2
(45) Date of Patent: Aug. 23, 2016

(54) CATALYST FOR THERMOCHEMICAL WATER SPLITTING

(71) Applicant: SAUDI BASIC INDUSTRIES CORPORATION, Riyadh (SA)

(72) Inventors: Hicham Idriss, Riyadh (SA); Ibraheam Al-Shankiti, Riyadh (SA); Yong Man Choi, Riyadh (SA); Faisal Mohammed Al-Otaibi, Riyadh (SA)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 0 days.

(21) Appl. No.: 14/407,335

(22) PCT Filed: Jul. 24, 2013

(86) PCT No.: PCT/IB2013/056088
§ 371 (c)(1),
(2) Date: Dec. 11, 2014

(87) PCT Pub. No.: WO2014/016790
PCT Pub. Date: Jan. 30, 2014

(65) Prior Publication Data
US 2015/0147260 A1    May 28, 2015

(30) Foreign Application Priority Data

Jul. 25, 2012  (EP) .................................. 12005418

(51) Int. Cl.
*B01J 37/12* (2006.01)
*B01J 21/06* (2006.01)
*C01B 3/06* (2006.01)
*C01B 31/18* (2006.01)
*B01J 35/02* (2006.01)

(Continued)

(52) U.S. Cl.
CPC ................ *B01J 37/12* (2013.01); *B01J 21/066* (2013.01); *B01J 23/10* (2013.01); *B01J 23/12* (2013.01); *B01J 35/002* (2013.01); *B01J 35/02* (2013.01); *B01J 35/1014* (2013.01); *B01J 37/031* (2013.01); *B01J 37/10* (2013.01); *B01J 37/16* (2013.01); *C01B 3/045* (2013.01); *C01B 3/063* (2013.01); *C01B 31/18* (2013.01); *B01J 2523/00* (2013.01); *Y02E 60/364* (2013.01)

(58) Field of Classification Search
CPC ........ B01J 37/10; B01J 37/031; B01J 21/066; B01J 35/1014; B01J 23/10; B01J 23/12; B01J 37/12; B01J 37/16; B01J 2523/00; B01J 35/002; B01J 35/02; C01B 3/063; C01B 31/18; C01B 3/045; Y02E 60/364
See application file for complete search history.

(56) References Cited

FOREIGN PATENT DOCUMENTS

| GB | 1489054 | 8/1975 |
|---|---|---|
| GB | 1489054 A * | 10/1977 |

OTHER PUBLICATIONS

Schleifer et al. "Solid solutions and phase equilibria in (U, Zr, Ln) oxides in the temperature range 1270-1670K" Journal of nuclear materials, 101, 1981, 150-161.*

(Continued)

*Primary Examiner* — Stanley Silverman
*Assistant Examiner* — Syed Iqbal
(74) *Attorney, Agent, or Firm* — Cantor Colburn LLP

(57) ABSTRACT

The present invention relates to a catalyst for the thermochemical generation of hydrogen from water and/or the thermochemical generation of carbon monoxide from carbon dioxide comprising a solid solution of cerium dioxide and uranium dioxide.

8 Claims, 2 Drawing Sheets

(51) Int. Cl.

| | |
|---|---|
| *B01J 23/10* | (2006.01) |
| *B01J 37/03* | (2006.01) |
| *B01J 37/10* | (2006.01) |
| *B01J 37/16* | (2006.01) |
| *B01J 23/12* | (2006.01) |
| *B01J 35/00* | (2006.01) |
| *B01J 35/10* | (2006.01) |
| *C01B 3/04* | (2006.01) |

(56) References Cited

OTHER PUBLICATIONS

Alex Le Gal et al. "CO2 and H2O splitting for thermochemical production of solar fuels using nonstoichiometric ceria and ceria/zirconia solid solutions", Energy and Fuels, 2011, 25, 4836-4845.*
Abrefah et al., "High temperature oxidation of UO2 in steam-hydrogen mixtures" Journal of Nuclear Materials 208 (1994) 98-110.
Badwal et al., "The Electrode Kinetics of the Evolution and Dissolution of Oxygen at the Urania-Zirconia Interfaces," Electrochimica Acta, vol. 25, (1980), pp. 1115-1125.
Chueh et al., "High-Flux Solar-Driven Thermochemical Dissociation of CO2 and H2O Using Nonstoichiometric Ceria," Science, vol. 330, (2010), pp. 1797-1801.
Extended European Search Report for Application No. 12005418.4, Date of Mailing Feb. 4, 2013; 7 Pages.
International Search Report for International Application No. PCT/IB2013/056088; International Filing Date: Jul. 27, 2013; Date of Mailing Dec. 17, 2013; 5 Pages.
Kaneko et al, "Reduction reactivity of CeO2-ZrO2 oxide under high O2 partial pressure in two-step water splitting process," Solar Energy vol. 85 (2011), pp. 2321-2330.
Kaneko et al., "Reactive ceramics of CeO2-MOx (M=Mn, Fe, Ni, Cu) for H2 generation by two-step water splitting using concentrated solar thermal energy," Engery 32 (2007) 656-663.
Le Gal et al., "CO2 and H2O Splitting for Thermochemical Production of Solar Fuels Using Nonstoichiometric Ceria and Ceria/Zirconia Solid Solutions," Energy Fuels 2011, vol. 25, pp. 4836-4845.
Schleifer et al., Solid Solutions and Phase Equilibria In (U, Zr, Ln) Oxides in the Temperature Range 1270-1670 K*, Journal of Nuclear Materials 101 (1981), pp. 150-161.
Written Opinion of the International Searching Authority for International Application No. PCT/IB2013/056088; International Filing Date: Jul. 27, 2013; Date of Mailing Dec. 17, 2013; 5 Pages.

* cited by examiner

CATALYST FOR THERMOCHEMICAL WATER SPLITTING

CROSS REFERENCE TO RELATED APPLICATIONS

This application is a 371 of International Application No. PCT/IB2013/056088, filed Jul. 24, 2013, which claims priority to European Application No. 12005418.4, filed Jul. 25, 2012, both of which are hereby incorporated by reference in its entirety.

The present invention relates to a catalyst for the thermochemical generation of hydrogen from water and/or the thermochemical generation of carbon monoxide from carbon dioxide. The present invention further relates to a method for the preparation of a catalyst for the thermochemical generation of hydrogen from water and/or the thermochemical generation of carbon monoxide from carbon dioxide. The present invention further relates to a reactor and a method for the generation of hydrogen and/or carbon monoxide. The present invention further relates to a solid solution and the use of a solid solution.

Energy and environmental issues at a global level are important topics and to that extent focus has been on the generation of clean energy for some time. Hydrogen in its diatomic form, $H_2$, as an energy carrier has the potential to meet at least in part the global energy needs. When diatomic hydrogen is reacted with oxygen the energy stored within the H—H bond is released while producing water ($H_2O$) as the end product. This, combined with the energy density of hydrogen of about 122 kJ/g, gives clear advantages for the use of hydrogen ($H_2$) as a fuel.

As a reacting component, hydrogen is used in several industrial chemical processes, such as for example the synthesis of methanol, higher hydrocarbons and ammonia.

Unfortunately hydrogen is not naturally available in abundance in its diatomic form. Rather, due to its high reactivity, hydrogen is more commonly bonded as single atoms to other elements, such as oxygen and/or carbon. The generation of diatomic hydrogen from these compounds is in contention with the laws of thermodynamics and therefore requires additional energy to break these naturally occurring bonds.

At present hydrogen is produced mainly from fossil fuels, biomass and water. Although the technique of diatomic hydrogen generation by steam reforming of natural gas is mature it cannot guarantee long-term strategy for a hydrogen economy because it is neither sustainable nor clean. The production of diatomic hydrogen through the electrolysis of water is not an energy efficient process as the hydrogen obtained through this process carries less energy than the energy input that is needed to produce it.

Thus, research has focused on the development of new methods to produce hydrogen.

The worldwide availability of solar energy is said to be about $4.3 \times 10^{20}$ J/h, corresponding to a radiant flux density of about 1000 W/m². A sustainable method of generating hydrogen would therefore be to use solar energy.

Hydrogen may be generated from water by contacting water under appropriate high temperature conditions with a catalyst. This so called thermochemical generation of hydrogen from water may be carried out using a reducible metal oxide as a catalyst. The metal oxide generally is a solid material. The process may comprise two steps.

In a first step a metal oxide is reduced thereby generating diatomic oxygen, O2. The skilled person will understand that this first step does not involve contacting the catalyst with water. Then, in a second step following the first step the reduced metal oxide is oxidised again using water as the oxidising agent. The catalyst is oxidised using oxygen from the water molecules resulting in the generation of hydrogen. This process can be repeated in cycles.

An overall reaction mechanism may be represented by the following reaction scheme:

$$MO_x \rightarrow MO_{x-1} + \tfrac{1}{2}O_2 \quad \text{(Step 1)}$$

$$MO_{x-1} + H_2O \rightarrow MO_x + H_2 \quad \text{(Step 2a)}$$

Wherein M represents a metal and $x \geq 1$

The reaction of step 1, which is endothermic, is regarded by the present inventors as the bottle neck of the two-step process because the reaction requires a relatively high amount of energy. The reaction of step 2a is exothermic and results in MOx again which in turn may be reduced again in a further step 1. Said in another way, the steps 1 and 2a may be repeated in cycles allowing hydrogen and oxygen to be generated in relatively high amounts and in a substantially continuous manner.

In an alternative or in addition to reaction step 2a, i.e. the oxidation step, carbon dioxide can be used to oxidise the reduced metal oxide so as to form carbon monoxide.

$$MO_{x-1} + CO_2 \rightarrow MO_x + CO \quad \text{(Step 2b)}$$

The present inventors believe it is possible to use a mixture of water and carbon monoxide, resulting in simultaneous reactions according to step 2a and step 2b. The gaseous mixture which is then formed, i.e. a mixture comprising both hydrogen and carbon monoxide can be used as syngas. Syngas in turn may be used for further reaction(s) into a wide variety of chemicals.

In view of the above reaction scheme the skilled person will understand that the material that is being reduced and oxidised in cycles in steps 1 and 2a and/or 2b is not consumed. As used herein therefore such a material is regarded as a catalyst, more in particular a catalyst for the thermochemical generation of hydrogen from water and/or the thermochemical generation of carbon monoxide from carbon dioxide.

Unless indicated otherwise the term oxygen as used herein is to be understood as meaning diatomic or molecular oxygen, $O_2$.

Unless indicated otherwise the term hydrogen as used herein is to be understood as meaning diatomic or molecular hydrogen, $H_2$.

Chue et al (Dissociation of $CO_2$ and $H_2O$ Using Nonstoichiometric Ceria; William C. Chueh, Christoph Falter, Mandy Abbott, Danien Scipio, Philipp Furler, Sossina M. Haile, Aldo Steinfeld, Science, Vol. 330, 24 Dec. 2012, 1797-1780) have reported a device and process for high flux solar driven thermochemical dissociation of $CO_2$ and $H_2O$ using nonstoichiometric ceria. In this article it is reported that oxygen evolution was observed at an onset temperature of about 900° C. With ceria is meant cerium oxide.

The publication of Kaneko et al (Reduction reactivity of $CeO_2$—$ZrO_2$ oxide under high $O_2$ partial pressure in two-step water splitting process; H. Kaneko, S. Taku, Y. Tamaura; Solar Energy 85, 2011, 2321-2330) also discloses a ceria based catalyst for a two step water splitting process. It was concluded that, the $O_2$-releasing reaction proceeded under the air with a $CeO_2$—$ZrO_2$ oxide prepared by polymerized complex method and also the cyclic redox reaction of $CeO_2$—$ZrO_2$ could be successfully repeated. The amount of $O_2$ gas evolved with $Ce_{1-x}Zr_xO_2$ ($0 \leq x \leq 0.3$) was more than that with $CeO_2$, and the maximum volume of 2.9 cm³/g was indicated with $Ce_{0.8}Zr_{0.2}O_2$ (x=0.2). The yield of the reduced cerium ions which changed from $Ce^{4+}$ to $Ce^{3+}$ in $Ce_{0.8}Zr_{0.2}O_2$ was about 11%, which was seven times larger than that in $CeO_2$. It was confirmed that the $Ce^{3+}$ and oxygen vacancy in $CeO_2$—$ZrO_2$ oxide slightly increased in the $O_2$-releasing reaction. The enhancement of the $O_2$-releasing reaction with $CeO_2$—$ZrO_2$ oxide was found to be caused by introduction of $Zr^{4+}$, which had smaller ionic radius than $Ce^{3+}$ or $Ce^{4+}$, in the fluorite structure. The expansion of crystal lattice due to reduction of $Ce^{4+}$ was compensated by migrated $Zr^{4+}$ in the fluorite structure.

It is an object of the present invention to provide a catalyst for the thermochemical generation of hydrogen.

More specifically it is an object to provide a catalyst for the thermochemical generation of hydrogen based on metal oxide reduction and oxidation cycles wherein the amount of energy that is required for the reduction of the catalyst is relatively low.

It is another object of the present invention to provide a catalyst for the thermochemical generation of hydrogen which in use results in relatively high yield of hydrogen formation.

To that extent the present invention provides a catalyst for the thermochemical generation of hydrogen from water and/or the thermochemical generation of carbon monoxide from carbon dioxide comprising a solid solution of cerium dioxide and uranium dioxide.

$CeO_2$ has a fluorite structure in which $Ce^{4+}$ is eight-fold coordinated to $O^{2-}$ and $O^{2-}$ is four-fold coordinated to $Ce^{4+}$. In order to maintain stoichiometry every other unit cell is empty of $Ce^{4+}$. This structure, combined with the relatively weak $Ce^{4+}$ to $O^{2-}$ bond strength allows for fast oxygen diffusion, sometimes referred to as ionic mobility.

In order to decrease the energy required for the reduction reaction, i.e. the removal of oxygen anions, the present inventors propose to substitute some of the $Ce^{4+}$ cations by uranium cations, $U^{4+}$, which have a similar ionic radius as $Ce^{4+}$ cations.

$CeO_2$ is a reducible metal oxide, which may be reduced to a form $CeO_{2-z}$, where z is at most 0.5, thus forming $Ce_2O_3$. If $CeO_{2-z}$ is combined with a metal oxide that prefers to be bound to the oxygen released from $CeO_2$, the reducibility of the $CeO_2$ will be enhanced and thus requires less energy. Uranium dioxide, $UO_2$, has the same fluorite structure as $CeO_2$ and $U^{4+}$ cations have a similar ionic radius as $Ce^{4+}$. In addition to that $UO_2$ is easily oxidized while maintaining its fluorite structure intact up to $UO_{2.25}$. This finding is in part based on computational methods using Density Functional Theory which was conducted using the Quantum Espresso code with the Generalised Gradient Approximation. The computation led to the finding that the presence of two phases in discrete contact would allow for the $O^{2-}$ anions to diffuse from $CeO_2$ to $UO_2$. This is believed to result in the formation of $CeO_{2-z}$ and $UO_{2+z}$. The present inventors conclude from this that the energy required for the reduction reaction may be lower. The computational results were confirmed experimentally.

Upon application of the catalyst of the invention therefore at least some of the objects of the present invention are met.

Solid solutions of $UO_2$ and $CeO_2$ may be obtained over substantially the whole concentration range of uranium dioxide and cerium dioxide and the present inventors have observed that even pure $UO_2$ is capable of being used as a catalyst for the thermochemical generation of hydrogen from water and/or the thermochemical generation of carbon monoxide from carbon dioxide. In a preferred embodiment a molar ratio of cerium and uranium in the solid solution is from 50 to 0.05, preferably from 10 to 0.1, more preferably from 10 to 1.

For a molar ratio of 10 for example this means that per mole of cerium it is preferred that the solid solution contains from 0.1 mole of uranium.

The solid solution in the catalyst of the present invention preferably further contains zirconium dioxide in an amount of at most 40.0 mol % based on the total amount of cerium dioxide, uranium dioxide and zirconium dioxide. The present inventors have found that above 40 mol % of zirconium dioxide the fluorite crystal structure is lost at least in part, which has a negative effect on the performance of the catalyst. In a preferred embodiment the amount of zirconium dioxide is from 10 mol % to 40 mol %, more preferably from 30 mol % to 35 mol % based on the total amount of cerium dioxide, uranium dioxide and zirconium dioxide.

The solid solution in the catalyst according to the present invention predominantly has a fluorite crystal structure, meaning that there may be some structural defects present in the crystal structure yet such defects are only present in a very low amount, for example at most 2%, preferably at most 1%, more preferably at most 0.1% by volume of the liquid solution.

In a solid solution of cerium dioxide and uranium dioxide having a fluorite crystal structure some of the cerium ions have been substituted for uranium ions leaving the overall crystal structure intact. In an embodiment where the solid solution further comprises zirconium dioxide, cerium ions may also be substituted by zirconium ions.

Preferably the total amount of cerium dioxide, uranium dioxide and optionally zirconium dioxide in the solid solution is at least 95.0 wt %, more preferably at least 99.0 wt %, even more preferably at least 99.9 wt %. Hence, in absence of any zirconium the solid solution comprises at least 95.0 wt % of cerium dioxide and uranium dioxide. If the solid solution also contains zirconium the combined amount of cerium dioxide, uranium dioxide and zirconium dioxide is at least 95 wt %.

The present invention further relates to a solid solution comprising cerium dioxide, uranium dioxide and zirconium dioxide, wherein the amount of zirconium dioxide is at most 40 mol % based on the total amount of cerium dioxide, uranium dioxide and zirconium dioxide. Such a solid solution can advantageously be used in a catalyst for the thermochemical generation of hydrogen from water and/or the thermochemical generation of carbon monoxide from carbon dioxide. In a preferred embodiment the amount of zirconium dioxide is from 10 mol % to 40 mol %, more preferably from 30 mol % to 35 mol % based on the total amount of cerium dioxide, uranium dioxide and zirconium dioxide.

In a preferred embodiment of the solid solution a molar ratio of cerium and uranium in the solid solution is from 50 to 0.05, preferably from 10 to 0.1, more preferably from 10 to 1.

The solid solution of the catalyst of the present invention may be produced with a method comprising the steps of dissolving a cerium salt, a uranium salt and optionally a zirconium salt in water followed by precipitation at a pH of at least 8 by addition of a base. Such methods are known in the art.

The catalyst of the present invention may be produced with a method comprising the steps of dissolving a cerium salt, a uranium salt and optionally a zirconium salt in water followed by precipitation at a pH of at least 8 by addition of a base followed by drying the obtained precipitate and calcining the precipitate at elevated temperature. Such methods are known in the art.

The catalyst of the present invention is generally used in solid form, preferably in the form of a powder or a porous structure.

The BET surface area of the catalyst according to the invention is preferably at least 10 m²/g, more preferably at least 20 m²/g. A preferred BET surface area is from 20 to 100 m²/gram. The surface area was determined according to the standard BET nitrogen test, ASTM D-3663-03, ASTM International, October 2003.

The present invention also relates to a method for the generation of hydrogen from water and/or the generation of carbon monoxide from carbon dioxide comprising the steps of:
a. providing a catalyst according to the present invention
b. reducing at least part of said catalyst at a first elevated temperature
c. oxidising the at least partially reduced catalyst of step b by contacting said at least partially reduced catalyst with water and/or carbon dioxide at a second elevated temperature which may be the same or different from the first elevated temperature.

The atmosphere during step b) may be any inert gas, such as nitrogen, argon, helium or mixtures thereof. In the first step of the first cycle also hydrogen may be used to reduce the catalyst for the first time. It is preferred to use a nitrogen atmosphere. The skilled person will understand that in step b) the metal ions in the solid solution will be reduced from a first valence state to a second valence state which is lower than the first valence state. Generally the first valence state will be four, meaning that $Ce^{4+}$, $U^{4+}$ and optionally $Zr^{4+}$ may be reduced to a lower valence state, preferably $Ce^{3+}$, $U^{3+}$ and $Zr^{3+}$.

The water and/or carbon dioxide in step c) may be provided separate or as a mixture and may be admixed with an inert carrier gas such as nitrogen, argon or helium, nitrogen being preferred. The water is preferably added in gaseous state in the form of steam.

Preferably the second elevated temperature is lower than the first elevated temperature. This is due to the fact that the reduction reaction, i.e. step b), is endothermic and requires a relatively high amount of energy, whereas the oxidation reaction, i.e. step c), is exothermic and requires less energy. That said, in order to have a relatively fast oxidation reaction high temperatures are nevertheless preferred.

In a preferred embodiment the first elevated temperature is from 600° C. to 1200° C., preferably from 1000° C. to 1200° C. Above 1200° C. overall production cost increase due to the need for more demanding materials for the reactor that is used as well as the need for more energy input. Below a temperature of 600° C. hardly any reduction is observed.

In a preferred embodiment the second elevated temperature is from 600° C. to 1000° C., preferably from 600° C. to 900° C. Below 600° C. the hydrogen generation rate reduces affecting the overall hydrogen (or carbon monoxide) generation capacity.

The temperature difference between the first and second elevated temperature preferably is not too high. Preferably this temperature difference is 200° C. at most. The main reason for this is that large temperature differences impose more stringent requirements on the reactor in terms of material choice and design. Moreover the cooling and heating respectively need time and as such may negatively influence the hydrogen and/or carbon monoxide generation rate.

The method for the thermochemical generation of hydrogen from water and/or the thermochemical generation of carbon monoxide from carbon dioxide according to the present invention is preferably performed in cycles, meaning that after a first step b) and followed by a first step c) the steps b) and c) are repeated in the same sequence during a number of cycles. The present inventors have observed that the catalyst of the present invention is stable over time, i.e. that the catalyst may be used for a relatively large number of cycles.

In order to provide a sustainable process the energy that is required to provide the first and/or second elevated temperature is preferably obtained from the sun, i.e. solar energy is used to provide the required energy.

In a further aspect of the present invention a reactor for producing hydrogen and/or carbon monoxide is provided, said reactor comprising a reaction zone comprising the catalyst according to the present invention, means for heating said reaction zone, means for introducing gasses into the reaction zone and means for extracting gasses from the reaction zone.

The means for heating may be any known heating devices common in the art, including the solar energy solution as for example disclosed by Chue et al (Dissociation of $CO_2$ and $H_2O$ Using Nonstoichiometric Ceria; William C. Chueh, Christoph Falter, Mandy Abbott, Danien Scipio, Philipp Furler, Sossina M. Haile, Aldo Steinfeld, Science, Vol. 330, 24 Dec. 2012, 1797-1780). Introduction of gasses into the reactor and/or the reaction zone may be performed using known methods and using suitable piping and/or injection systems, valves, (mass) flow controllers and the like. Extraction of gasses from the reaction zone and/or the reactor may be performed using known methods using suitable piping systems, valves, pumps and/or fans.

In order to manufacture hydrogen or carbon monoxide on an industrial scale the present inventors propose to use a number of reactors operating in parallel. Although syngas may be generated by one reactor, for manufacturing of syngas on an industrial scale it is preferred to have dedicated carbon monoxide and hydrogen reactors, wherein the hydrogen and carbon monoxide can be mixed to the desired $H_2$:CO ratio downstream of the reactors.

The present invention further relates to the use of a solid solution of cerium dioxide and uranium dioxide as a catalyst for the thermochemical generation of hydrogen from water and/or the thermochemical generation of carbon monoxide from carbon dioxide.

The present invention will now be further explained on the basis of the following non-limiting figures and examples.

The present inventors have applied Density Functional Theory calculations using the Quantum Espresso code with the Generalised Gradient Approximation, in order to determine the energy of formation of an oxygen vacancy. The calculations were conducted upon creation of one oxygen vacancy assuming the oxygen vacancy and the metal cation ($M^{4+}$) are nearest neighbours and wherein in a $CeO_2$ fluorite structure the ratio $M^{4+}$ to $Ce^{4+} \approx 0.03$.

The present inventors found that zirconium, when added to a fluorite $CeO_2$ crystal structure reduces the energy of formation of an oxygen vacancy, $E_{vo}$, from which the present inventors conclude that oxygen may be removed from the $CeO_2$ fluorite crystal structure more easily and hence that the material requires less energy for the reduction. In addition, the present inventors noted that the ionic radius of zirconium ($Zr^{4+}$) differs substantially from the ionic radius of cerium ($Ce^{4+}$) which has the effect that it is more difficult to maintain the desirable fluorite crystal structure upon higher amounts of zirconium.

The present inventors further noted that the ionic radius of uranium ($U^{4+}$) is close to the ionic radius of cerium ($Ce^{4+}$) whereas the $E_{vo}$ is significantly lower than the $E_{vo}$ for a cerium dioxide fluorite crystal structure. The $E_{vo}$ is further reduced compared to a crystal structure based on $CeO_2$ and $ZrO_2$. Given the similar ionic radius $U^{4+}$ may be added to the $CeO_2$ fluorite structure in substantially any amount without losing the fluorite crystal structure.

EXAMPLES 1 TO 6

$CeO_2$, $ZrO_2$, $Ce(Zr)O_2$, $Ce(Zr,U)O_2$, and $UO_2$ catalysts were prepared by the precipitation or co-precipitation method respectively using $NH_4OH$ at a pH of 8-9. The metal precursors were cerium nitrate, uranium nitrate and zirconium chloride. The single or mixed precipitated hydroxides were washed with de-ionized water until neutral pH, dried overnight at 100° C. and then calcined to make the oxides at 500° C. for 5 hours or more. X-ray diffraction, temperature programmed reduction (TPR), BET surface area, and X-ray photoelectron spectroscopy were conducted to further identify and study the catalysts.

Figure 1:
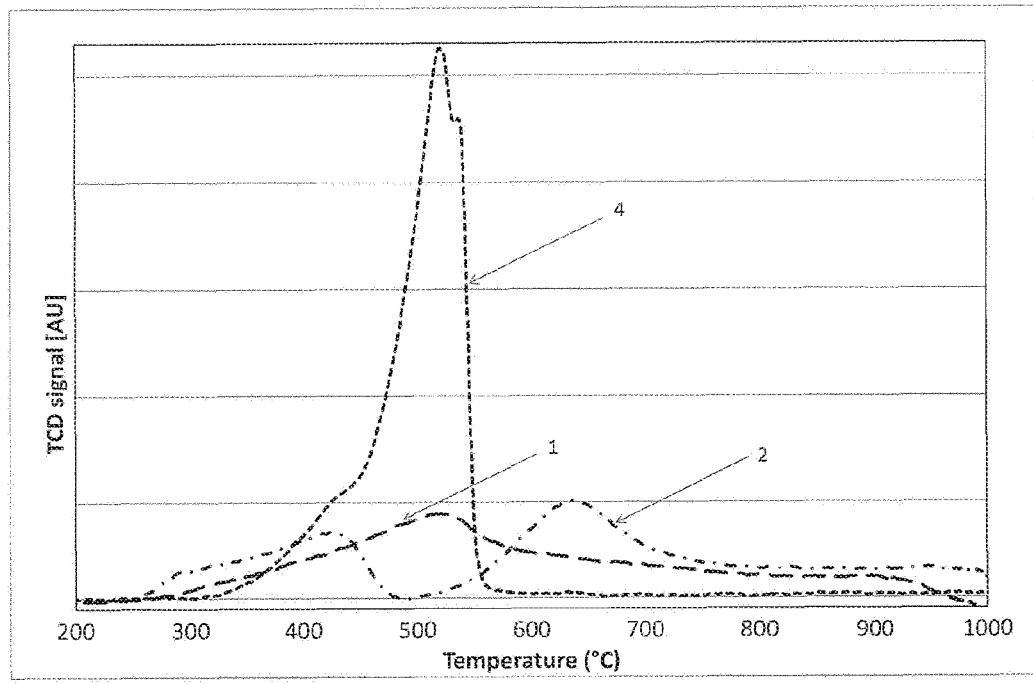
FIG. 1 shows the thermochemical generation of hydrogen for several catalysts not according to the present invention.
Figure 2:
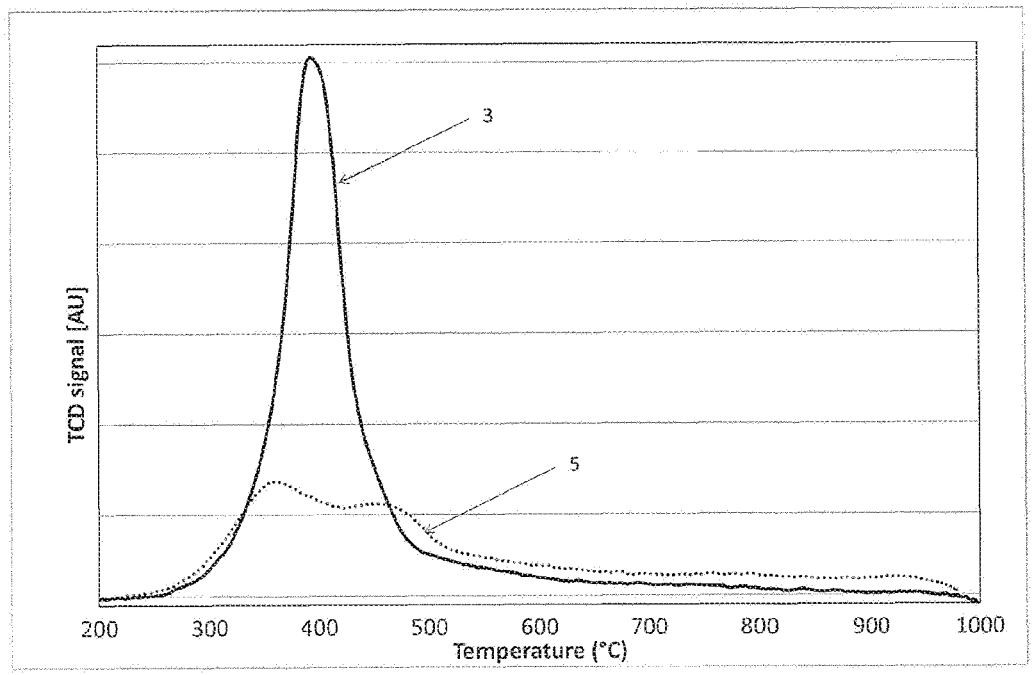
FIG. 2 shows the results of temperature programmed reduction (TPR) experiments for several catalysts according to the present invention.

The FIGS. 1 and 2 show the results of temperature programmed reduction experiments that were performed on catalysts 1 to 5 of Table 1 below. Temperature programmed reduction is a technique known to the skilled person for the characterization of solid materials and is often used in the field of heterogeneous catalysis to find the most efficient reduction conditions. An oxidized catalyst is submitted to a programmed temperature rise while a reducing gas, in the present case a mixture of hydrogen ($H_2$) and nitrogen is flowed over it. The change in composition of this reducing gas is measured as a function of temperature by means of a gas chromatograph equipped with a thermal conductivity detector. This change is reflected in FIGS. 1 and 2 on the vertical axis, which plots the signal of said thermal conductivity detector, referred to as TCD signal.

The following catalysts were subjected to the temperature programmed reduction measurement:

TABLE 1

| Example | Composition | Hydrogen consumption [ml/g catalyst] |
|---|---|---|
| 1* | $Ce_{0.66}Zr_{0.34}O_2$ | 22 |
| 2* | $CeO_2$ | 24 |
| 3 | $Ce_{0.5}U_{0.5}O_2$ | 34 |
| 4* | $UO_2$ | 28 |
| 5 | $Ce_{0.65}Zr_{0.25}U_{0.1}O_2$ | 27 |
| 6* | $ZrO_2$ | 0 |

*= Not according to the invention

The hydrogen consumption as shown in Table 1 is determined by measuring the area under the curves of FIGS. 1 and 2.

From Table 1 it is clear that the catalyst of Example 3 shows the highest hydrogen consumption per gram of catalyst. In addition to that it is clear from FIG. 2 that this Example 3 catalyst is reduced at relatively low temperature compared to the catalysts of Examples 1, 2 and 4 for which the TPR curves are shown in FIG. 1. These results show that a cerium dioxide based catalyst according to the present invention not only allows a higher level of reduction, but also that reduction may be carried out at lower temperature, i.e. requiring less energy.

The present inventors observe that the higher level of reduction also results in a higher level of hydrogen and/or carbon monoxide generation when such reduced catalysts are oxidised again using water and/or carbon dioxide.

Table 1 further confirms that $ZrO_2$ cannot be used as a suitable catalyst for the thermochemical generation of hydrogen from water and/or the thermochemical generation of carbon monoxide from carbon dioxide.

Figure 3:
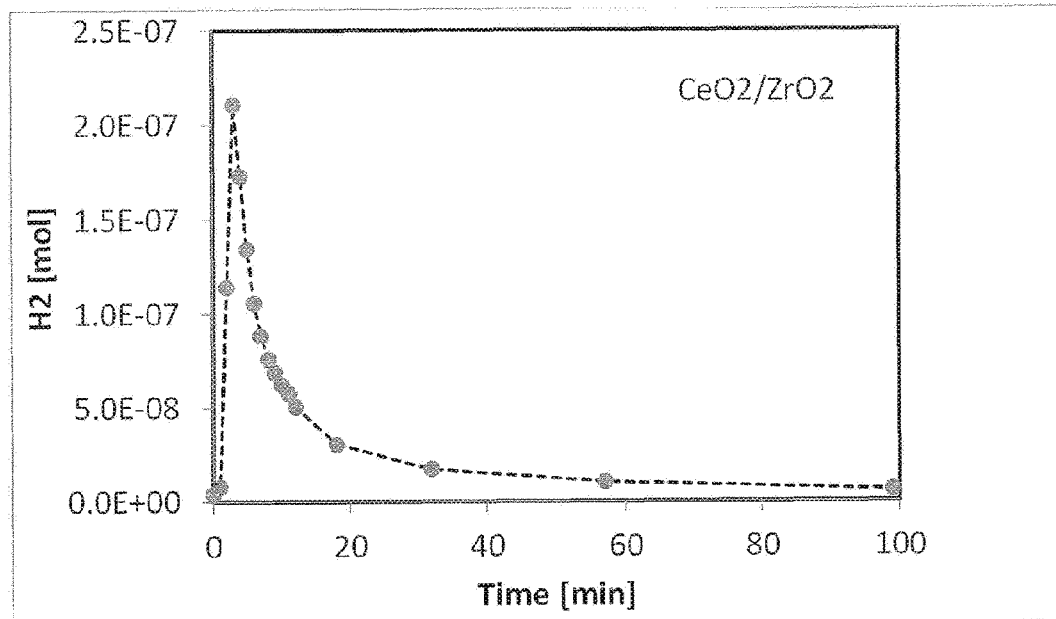
FIG. 3 shows the thermochemical generation of hydrogen for a catalyst not according to the present invention.
Figure 4:
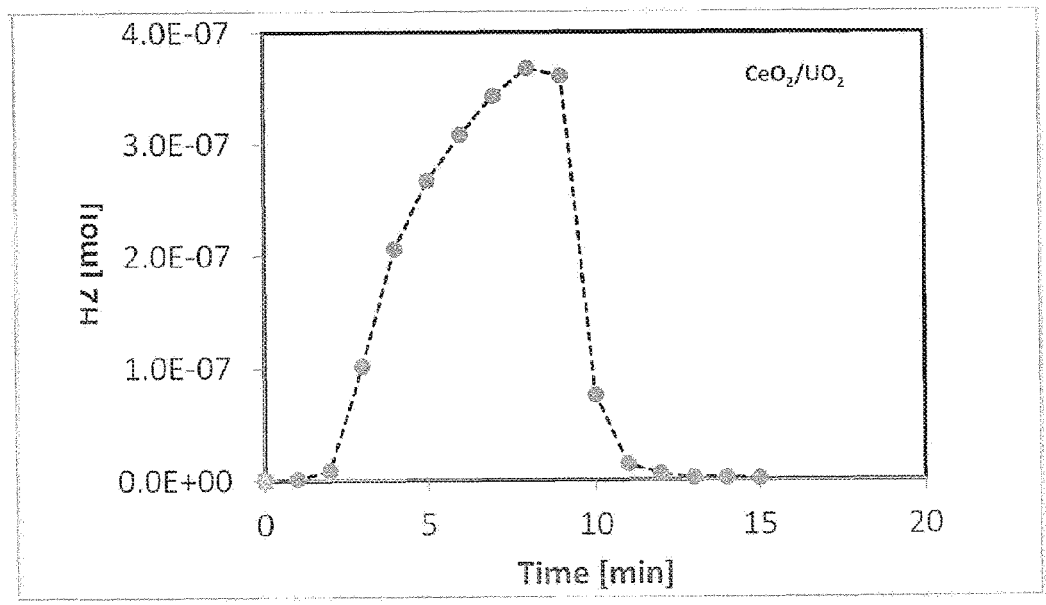
FIG. 4 shows the thermochemical generation of hydrogen for a catalyst according to the present invention.

This is reflected in FIG. 3 and FIG. 4 which show the hydrogen generation upon oxidising with water for a $CeO_2/ZrO_2$ (Example 1) and a $CeO_2/UO_2$ (Example 3) catalyst respectively.

On the horizontal axis the time during the oxidation step is shown, whereas on the vertical axis the moles of hydrogen that are generated are plotted. Both catalysts were produced using the same method and both were reduced at 1100° C. Oxidation was carried out by contacting the catalysts with steam using nitrogen as a carrier gas at a temperature of 1000° C.

The total amount of hydrogen that was formed upon oxidation of the $CeO_2/ZrO_2$ catalyst was $4 \times 10^{-6}$ mol/gram catalyst whereas the $CeO_2/UO_2$ catalyst according to the invention produced $7 \times 10^{-6}$ mol/gram catalyst. The present inventors further found that completion of the oxidation of the $CeO_2/ZrO_2$ catalyst may take considerable time, i.e. well over 20 minutes, whereas the completion of oxidation for the catalyst according to the present invention was completed in less than 20 minutes, namely approximately 15 minutes.

Set forth below are some embodiments of a catalyst for the thermochemical generation of hydrogen from water and/or the thermochemical generation of carbon monoxide.

EMBODIMENT 1

A catalyst for the thermochemical generation of hydrogen from water and/or the thermochemical generation of carbon monoxide from carbon dioxide comprising a solid solution of cerium dioxide and uranium dioxide.

EMBODIMENT 2

The catalyst according to Embodiment 1, wherein a molar ratio of cerium and uranium is from 50 to 0.05, preferably from 10 to 0.1, more preferably from 10 to 1.

EMBODIMENT 3

The catalyst according to Embodiment 1 or 2, wherein the solid solution further contains zirconium dioxide in an amount of at most 40.0 mol % based on the total amount of cerium dioxide, uranium dioxide, and zirconium dioxide.

EMBODIMENT 4

The catalyst according to one or more of the preceding Embodiments 1-3, wherein the solid solution has a fluorite crystal structure.

EMBODIMENT 5

The catalyst according to one or more of the preceding Embodiments 1-4, wherein a total amount of cerium dioxide, uranium dioxide, and optionally zirconium dioxide in the solid solution is at least 95.0 wt % based on the weight of the solid solution.

EMBODIMENT 6

The catalyst according to one or more of the preceding Embodiments 1-4, wherein a total amount of cerium dioxide, uranium dioxide, and optionally zirconium dioxide in the solid solution is at least 99.0 wt % based on the weight of the solid solution.

EMBODIMENT 7

The catalyst according to one or more of the preceding Embodiments 1-4, wherein a total amount of cerium dioxide, uranium dioxide, and optionally zirconium dioxide in the solid solution is at least 99.9 wt % based on the weight of the solid solution.

EMBODIMENT 8

A solid solution comprising cerium dioxide, uranium dioxide and zirconium dioxide, wherein the amount of zirconium dioxide is at most 40 mol % based on the total amount of cerium dioxide, uranium dioxide, and zirconium dioxide.

EMBODIMENT 9

A method for producing the solid solution according to any one or more of the preceding Embodiments 1-8 comprising: dissolving a cerium salt, a uranium salt, and optionally a zirconium salt in water followed by precipitation at a pH of at least 8 by addition of a base.

EMBODIMENT 10

A method for producing the catalyst according to any one or more of preceding Embodiments 1-7 comprising the method for producing the solid solution according to Embodiment 9 followed by drying the obtained precipitate and calcining the precipitate at elevated temperature.

EMBODIMENT 11

A method for the generation of hydrogen from water and/or the generation of carbon monoxide from carbon dioxide comprising: a) providing a catalyst according to any one or more of preceding Embodiments 1-7; b) reducing at least part of said catalyst at a first elevated temperature; c) oxidising the at least partially reduced catalyst of step b by contacting said at least partially reduced catalyst with water and/or carbon dioxide at a second elevated temperature which may be the same or different from the first elevated temperature.

EMBODIMENT 12

The method of Embodiment 11, wherein the second elevated temperature is lower than the first elevated temperature.

EMBODIMENT 13

The method of any one or more of the previous Embodiments 11-12 wherein the first elevated temperature is 600° C. to 1,200° C.

EMBODIMENT 14

The method of any one or more of the previous Embodiments 11-13 wherein the first elevated temperature is 1,000° C. to 1,200° C.

EMBODIMENT 15

The method of any one or more of the preceding Embodiments 11-14 wherein the second elevated temperature is 600° C. to 1,000° C.

EMBODIMENT 16

The method of any one or more of the preceding Embodiments 11-15 wherein the second elevated temperature is 600° C. to 900° C.

EMBODIMENT 17

The method of one or more of the preceding Embodiments 11-14, wherein the first and or second elevated temperature is obtained by heating using solar energy.

EMBODIMENT 18

Reactor for generating hydrogen and/or carbon monoxide comprising a reaction zone comprising the catalyst according to any one or more of preceding Embodiments 1-7, means for heating said reaction zone, means for introducing gasses into the reaction zone and means for extracting gasses from the reaction zone.

EMBODIMENT 19

The use of a solid solution of cerium dioxide and uranium dioxide as a catalyst for the thermochemical generation of hydrogen from water and/or the thermochemical generation of carbon monoxide from carbon dioxide.

The invention claimed is:

1. A method for producing the solid solution comprising cerium dioxide and uranium dioxide, wherein the method comprises dissolving a cerium salt, a uranium salt and optionally a zirconium salt in water followed by precipitation at a pH of at least 8 by addition of a base to form a precipitate.

2. The method according to claim 1, further comprising drying the obtained precipitate and calcining the precipitate at elevated temperature.

3. The method according to claim 1 wherein a molar ratio of cerium and uranium is from 50 to 0.05.

4. The method according to claim 1 wherein the solid solution has a fluorite crystal structure.

5. The method according to claim 1 wherein a total amount of cerium dioxide, uranium dioxide and optionally zirconium dioxide in the solid solution is at least 95.0 wt % based on the weight of the solid solution.

6. The method according to claim 1 wherein the molar ratio of cerium and uranium is from 10 to 0.1.

7. The method according to claim 1, wherein the total amount of cerium dioxide, uranium dioxide and optionally zirconium dioxide in the solid solution is at least 99.0 wt % based on the weight of the solid solution.

8. The method according to claim 1 wherein a molar ratio of cerium and uranium is from 10 to 1;
   wherein the solid solution further contains zirconium dioxide in an amount of at most 40.0 mol % based on the total amount of cerium dioxide, uranium dioxide and zirconium dioxide.
   the solid solution has a fluorite crystal structure; and
   a total amount of cerium dioxide, uranium dioxide and optionally zirconium dioxide in the solid solution is at least 99.0 wt %.

* * * * *